(12) United States Patent
Chen

(10) Patent No.: US 7,621,182 B2
(45) Date of Patent: Nov. 24, 2009

(54) SEALED FUEL LEVEL DETECTOR

(76) Inventor: Jack Chen, 300 Windsor Dr., Oak Brook, IL (US) 60523

( * ) Notice: Subject to any disclaimer, the term of this patent is extended or adjusted under 35 U.S.C. 154(b) by 256 days.

(21) Appl. No.: 11/784,678

(22) Filed: Apr. 9, 2007

(65) Prior Publication Data
US 2008/0245146 A1 Oct. 9, 2008

(51) Int. Cl.
*G01F 23/32* (2006.01)
(52) U.S. Cl. .............. 73/317; 73/313; 116/229
(58) Field of Classification Search .......... 73/313, 73/317
See application file for complete search history.

(56) References Cited

U.S. PATENT DOCUMENTS

| | | | |
|---|---|---|---|
| 3,382,719 A * | 5/1968 | Villeneuve ................ 73/715 |
| 3,456,760 A * | 7/1969 | Musse et al. ................ 184/6 |
| 3,686,451 A * | 8/1972 | Pottharst, Jr. ............ 200/84 R |
| 4,986,124 A * | 1/1991 | Byrne et al. ............... 73/317 |
| 5,305,639 A * | 4/1994 | Pontefract ................. 73/317 |
| 5,311,776 A * | 5/1994 | Morris ..................... 73/306 |
| 7,165,450 B2 * | 1/2007 | Jamnia et al. .............. 73/317 |
| 7,322,234 B2 * | 1/2008 | Vargas Da Silva .......... 73/313 |

* cited by examiner

*Primary Examiner*—Hezron Williams
*Assistant Examiner*—Rachel Black
(74) *Attorney, Agent, or Firm*—Robert L. Marsh

(57) ABSTRACT

A fuel level detector has a float connected to an arm that rotates a pivot pin. The pivot pin rotates in a hole in the wall of the detector, and the hole is sealed by a sleeve. One end of the sleeve is sealed to the housing of the detector surrounding the hole, and the opposite end of the sleeve is sealed around the outer surface of the pin.

8 Claims, 5 Drawing Sheets

SEALED FUEL LEVEL DETECTOR

The present application relates to devices for detecting the amount of liquid in a fuel tank, and in particular to a sealed detector which will not be subjected to the corrosive effects of liquid fuel.

BACKGROUND OF THE INVENTION

It is desirable to measure as accurately as possible and display to an operator of a vehicle the amount of liquid fuel in the vehicle fuel tank. The most commonly used method of measuring the amount of fuel in a tank includes a float connected to an arm which in turn is connected to a wiper for wiping along a pattern of contacts on a resistor card. As the level of fuel in the tank changes, the float and arm move with the fuel level and the wiper moves along the surface of the resistor card changing the resistance in a circuit connected to a fuel gauge.

Such fuel level sensors are mounted within the fuel tank and it is difficult and expensive to replace the fuel level sensor within a tank in the event of failure of the sensor. It is therefore desirable to provide a fuel level sensor that will not fail during the useful life of the vehicle. On the other hand, improvements in automobile technology have resulted in vehicles having a longer useful life. Shortages of fuel oil have resulted in searches for alternatives to fossil fuel and in particular to the development of methanol, which is known to be particularly corrosive. Furthermore, it is becoming increasingly evident that vehicle emissions contribute adversely to the environment and environmental concerns, and environmental legislation, have led to the formulation of complex additives to liquid fuel to reduce certain emissions, but these additives also adversely effect the compounds from which the resisting elements of the resistor cards are made. It is desirable, therefore, to have a level sensing device that is sealed against contact from the liquid fuel but can provide an electronic signal indicative of the level of fuel within a tank.

In my recent patent application Ser. No. 10/883,155 filed Jul. 1, 2004, I disclosed a fuel level sensor employing two magnets with like poles directed toward each other and a magnetic strength detector that is moveable toward one magnet and away from the other in response to changes in the level of fuel in the tank. Such a detector will provide an output that is linearly related to the level of fuel in the tank, however, fuel tanks are often irregular in shape and therefore a detector having an output that can be nonlinearly related to changes of the fuel level, such as can be provided by a resistor card, is desirable.

Efforts have been made to seal a resistor card within an enclosure and include within the enclosure a moveable, magnetic contact element that is responsive to a magnetic field originating from a moveable magnet outside the enclosure. The magnet is connected to the end of a wiper which in turn is connected to a float arm such that changes in the fuel level will cause the magnet to move along the surface of the enclosure causing the moveable contact within to move responsive to changes in the fuel level within the tank.

There are such circumstances, however, when such magnetic detectors are not useable. It would be desirable, therefore, to provide a fuel level detector that responds to changes in the level of fuel in a tank but is itself sealed within an enclosure so as to prevent contact with the fuel into the interior of the detector.

SUMMARY OF THE INVENTION

Briefly, the present invention is embodied in a sealed fuel level detector for detecting the level of fuel in a tank, where the fuel level detector includes a housing having an aperture therein and an outer surface. The outer surface of the housing, except for the aperture, is sealed against leakage. A float that changes elevation with changes in the level of fuel within the tank is attached to one end of an arm the opposite end of which is connected to a pivot pin that extends through the aperture and into the enclosure of the housing. Within the housing is a fuel level sensor of the type well known in the art that generates an electric signal in response to changes in the orientation of the float arm, and therefore responds to changes in the level of fuel within the tank.

A sleeve is provided having a first open end and a second open end with the sleeve fitted around the pivot pin. The first open end of the sleeve is sealed against leakage around the circumference of the pivot pin and the second open end of the sleeve is sealed against the outer surface of the housing. Where the sleeve is impervious to liquid fuel and is flexible, the first end of the sleeve can rotate with the pivot pin while the second end remains stationery with the housing and provides a seal that prevents liquid from entering between the outer surface of the pin and the inner surface of the aperture in the housing.

BRIEF DESCRIPTION OF THE DRAWINGS

A better understanding of the present invention will be had after a reading of the following detailed description taken in conjunction with the drawings wherein.

DETAILED DESCRIPTION OF THE PREFERRED EMBODIMENTS

Figure 1:
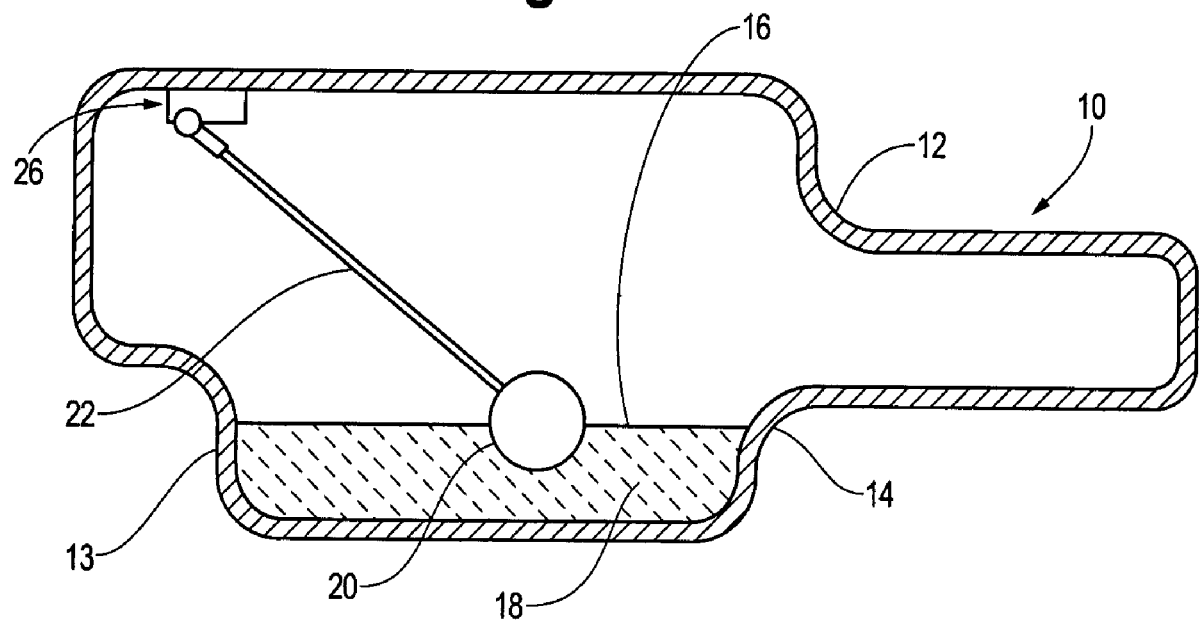
FIG. 1 is a cross-sectional view of a fuel tank having a fuel level sensor in accordance with the present invention.
Figure 2:
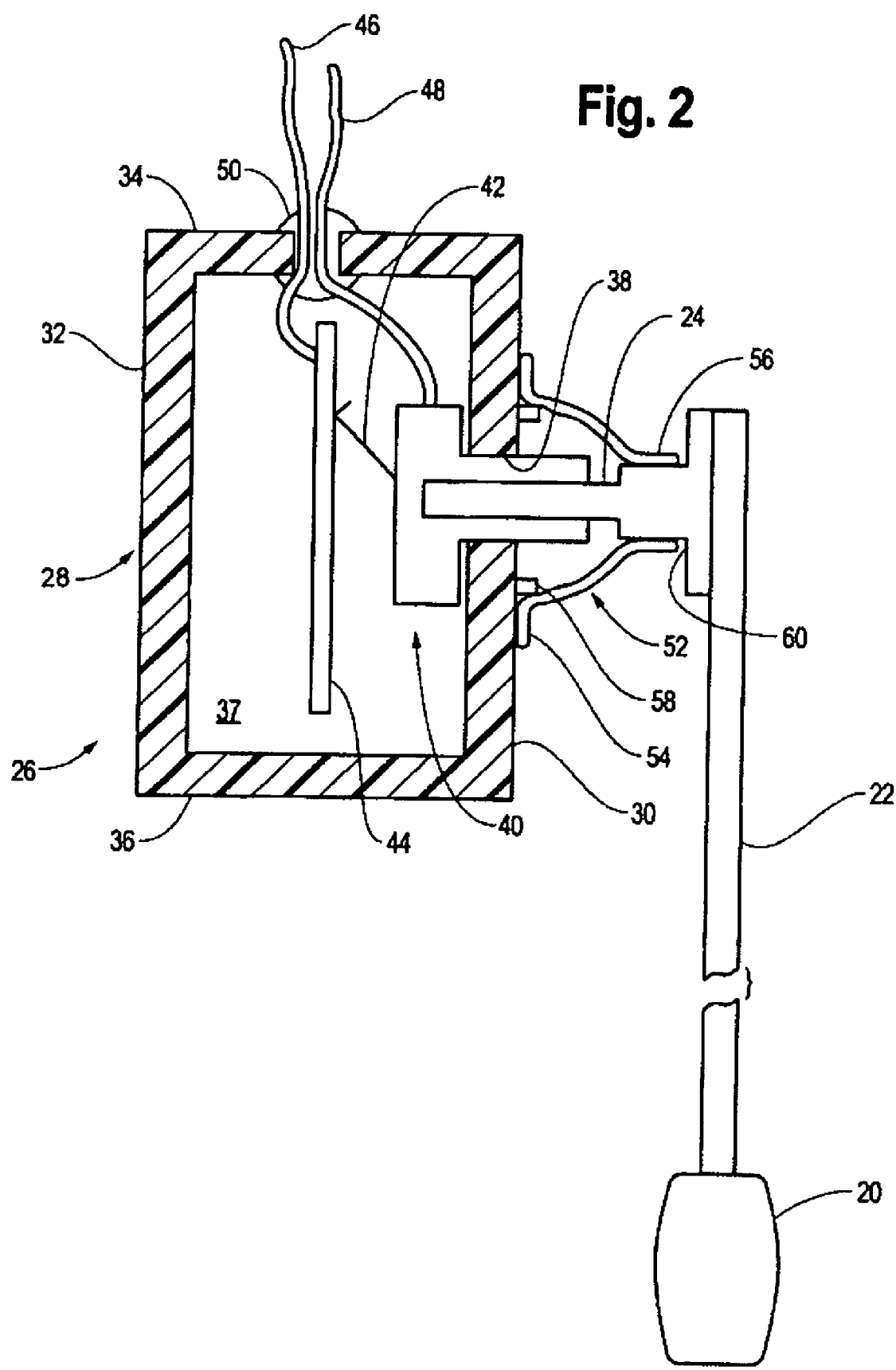
FIG. 2 is a cross-sectional view of the fuel level detector in the tank depicted in FIG. 1.

Referring to FIGS. 1 and 2, a fuel tank 10 of a vehicle is irregularly shaped in order to fit within the confines of the space available in a vehicle and has a plurality of indentations 12, 13, and 14 therein. The volume of liquid in the tank 10 is not proportional to the depth of the surface level 16 of fuel 18 therein because of the irregular shape of the tank 10. Fuel in the tank is measured by movement of a float 20 mounted on a float arm 22 which is moveable about a pin 24 that extends into a sealed fuel level detector 26.

Referring further to FIG. 2, the detector 26 includes a housing 28 that is immersed within the liquid fuel 18. The housing 28 includes first and second generally parallel spaced apart side walls 30, 32, and joining the outer edges of side wall 30 to side wall 32 are a plurality of end panels, two of which, 34, 36 are depicted to form an inner cavity 37. The pin 24 attached to the rod 22 and float 20 extends through an aperture 38 in side wall 30 and the distal end of the pin 24 operates a moveable portion of a fuel level sensor 40 of the type known in the art, that is positioned in the cavity 37. As has been previously stated, such fuel level detectors may include a wiper 42 mounted on a moveable retainer, and the end of the wiper 42 moves across a wiper path on a resistor card 44. Accordingly, changes in the surface level 16 of the liquid causes the float 20 to rise or fall thereby rotating the pin 24 and moving the distal end of the wiper 42 across the wiper card 44 and changing the resistance. A pair of wires 46, 48 each having one end connected to the sensor 40 extend through a sealed aperture 50 in an end panel 34 and the opposite ends of the wires 46, 48 are connected to a voltage measuring device, not shown, for displaying a voltage output as a measure of the liquid level 16 in the tank 10 in accordance with well known methods. It should be appreciated that although the sensor 40 has been described as having a wiper 42 and a resistor card 44, there are many other structures for fuel level detectors known in the art including fuel level detectors that rely on magnetic fields such as disclosed in my co-pending application filed Jul. 1, 2004 and assigned serial number 10/883,155. it should be appreciated that the present invention is not dependent upon the structure or operation of the fuel level sensor 40, but only requires that it be responsive to a rotating pin 24 and that the output be electrically transmittable through wires, such as wire 46, 48, extending through a wall 34 of the housing 28.

It is desirable that the housing 28 be sealed against leakage of liquid fuel 18 into the cavity 37 therein to thereby protect the elements of the fuel level detector 40 from the corrosive effects of the fuel 18. The various end panels 34, 36 of the housing 28 are therefore tightly sealed against the walls 30, 32 to prevent such leakage.

Figure 3:
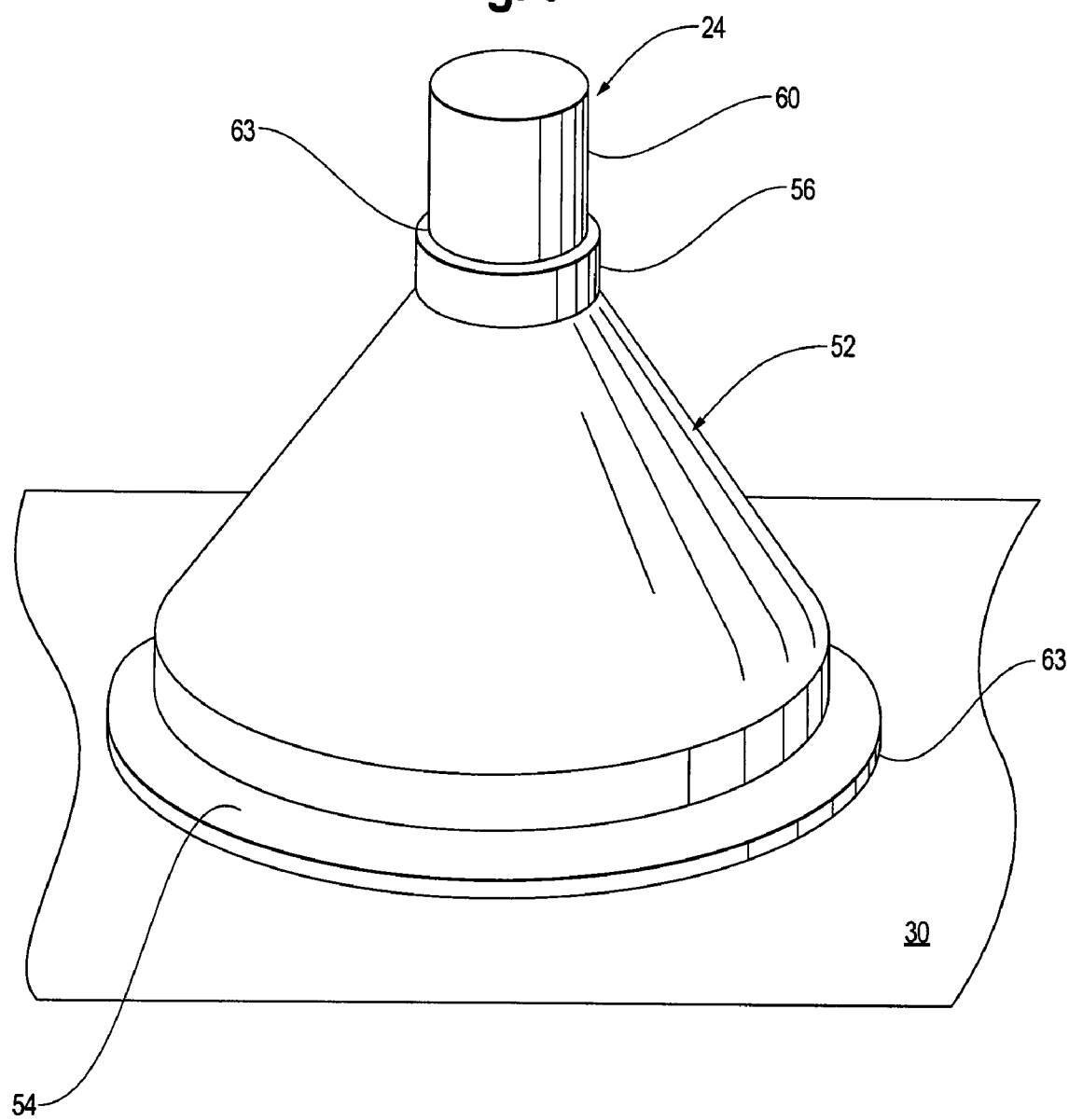
FIG. 3 is an enlarged isometric view of the sleeve used-in the detector shown in FIG. 2.

Referring to FIGS. 2 and 3, to prevent leakage between the cylindrical inner wall of the aperture 38 in side wall 30 and the cylindrical outer surface of the pin 24, a flexible sleeve 52 having a first open end 54 and a second open end 56 is fitted around the circumference of the pin 24. The first open end 54 of the sleeve 52 is sealed around a portion of the outer surface of a side wall 30 that extends around the aperture 38. To facilitate attachment of the sleeve end 54 to the surface 30 of the housing, a tubular projection 58 is provided that is concentric with the aperture 38. The second end 56 of the sleeve 52 is sealed around an enlarged cylindrical portion 60 of the pin 24 that is adjacent the attachment of the rod 22.

In accordance with the invention, the flexible sleeve 52 is loosely fitted between the tubular projection 58 and the cylindrical portion 60 so as to permit the first open end 54 of the sleeve 52 to undergo a rotation of approximately ninety to one hundred twenty degrees with respect to the second open end 56, thereby allowing the pin 24 to rotate in response to angular movement of the rod 22 and changes in elevation of the float 20. To prevent leakage through the material of the sleeve 52, the sleeve is made of a spun plastic material coated with a metal, so as to be resistive to the corrosive effects of the fuel 18. In this embodiment the tubular projection 58 has a relatively large outer diameter compared to the diameter of the aperture 38 and the first open end 54 of the sleeve 52 has a correspondingly relatively large diameter compared to the diameter of the second open end 56.

A first ultrasonic weld 62 may be used to bond the material of the first open end 54 to the outer surface of the tubular projection 58 and a second ultrasonic weld 63 seals the material of the second open end 56 to the outer surface of the cylindrical projection 60 to thereby ensure that there is no leakage into the cavity 37 of the housing 28 around the first or second open ends 54, 56 of the sleeve 52.

Figure 4:
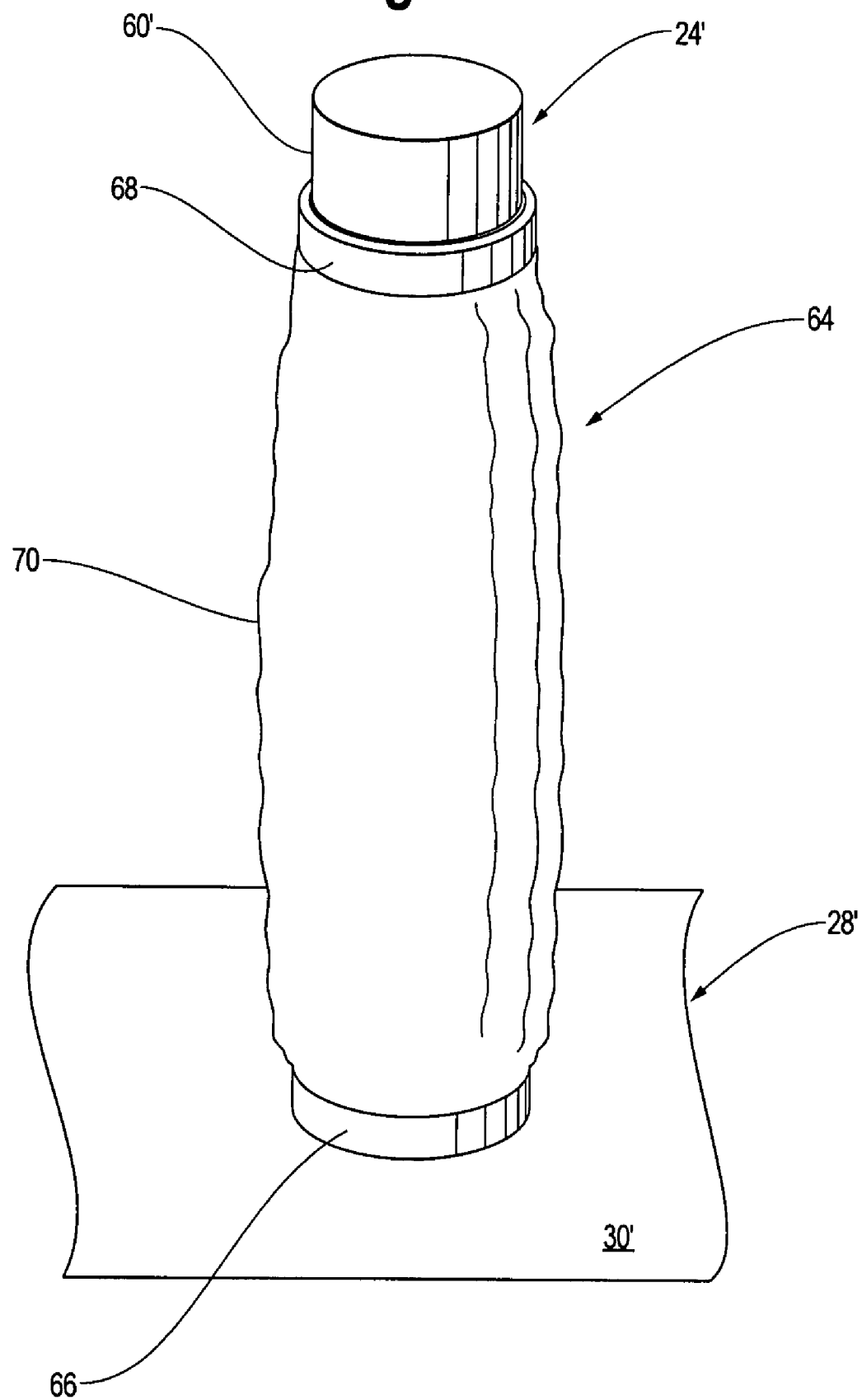
FIG. 4 is an enlarged isometric view of a second embodiment of a sleeve.

Referring to FIG. 4, a second embodiment of a sleeve 64 has a first open end 66 and a second open end 68 attached to a housing 28' and to a pivot pin 24' both of which have portions substantially identical to those of the housing 28 and pin 24 of the first embodiment and therefore all the portions thereof that are like the portions of the first embodiment bear like indicia numbers except they are primed. In this embodiment the tubular projection 58', not visible, has and inner diameter equal to the diameter of the aperture 38', also not visible, and an outer diameter equal to the diameter of the enlarged portion 60' of the pin 24'. The diameter of the first open end 66 of the sleeve 64 is therefor approximately equal to that of the second open end 68. The central portion 70 of the sleeve fits loosely along its length to permit rotation of the second open end 68 relative to the first open end 66. The central portion 70 of the sleeve is enlarged giving the sleeve 64 a bulbous or spherical appearance. This allows the material of which the sleeve 64 is made to fit loosely around the parts between the first open end 66 and the second open end 68.

Figure 5:
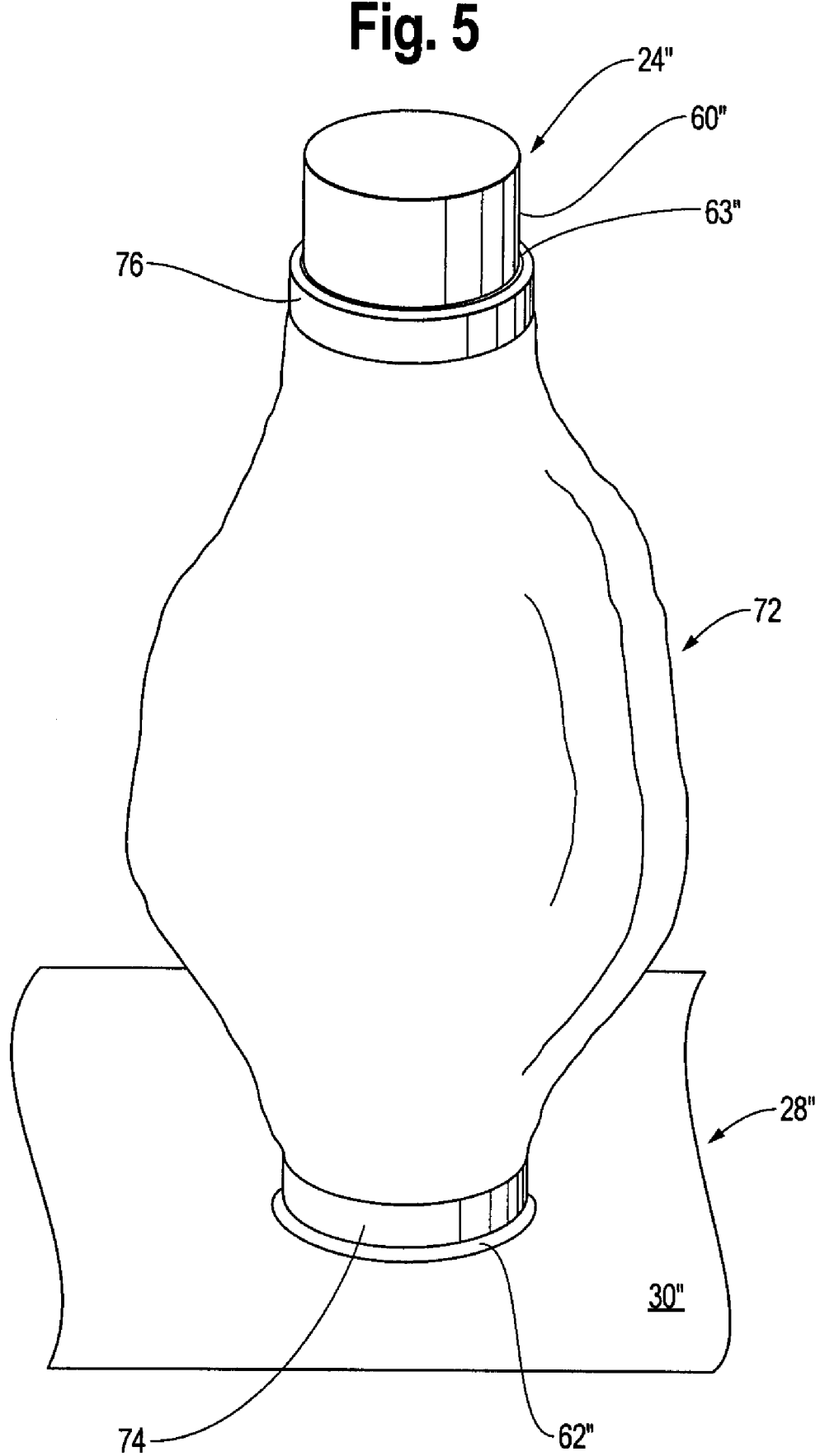
FIG. 5 is an enlarged isometric view of a third embodiment of a sleeve in accordance with the invention.

Referring to FIG. 5, in similar fashion a third embodiment of a sleeve 72 attached to a housing 28" and a rotatable pin 24" in which the parts thereof that are like elements of the first and second embodiments bear like indicia numbers except they are double primed. In this embodiment, the sleeve 72 has a first and second open ends 74, 76, respectively, that are approximately equal in diameter to each other similar to the open ends 66, 68 of the sleeve 64. The midportion 78 of the sleeve 72, however, has an enlarged diameter so as to have a bulbous configuration as shown. The first open end 74 of the sleeve 72 is sealed against the outer surface of the side wall 30" and bonded thereto by any appropriate means such as the ultrasonic welds 62" and 63". Like the sleeves 52, 64 of the first and second embodiments, the sleeve 72 is made of a flexible plastic material and suitably coated so as to be resistant to the corrosive effects of the fuel 18 in which the device is to be immersed.

With the housing 28, 28', 28" sealed with a flexible sleeve 52, 64, 70, as depicted and described above, the cavity of the housing is sealed against leakage of the fuel 18 into which the housing is immersed and therefore the fuel level detector 40 will not be subject to the corrosive effects of the fuel 18.

While the present invention has been described with respect to three embodiments, it will be appreciated that many modifications and variations may be made without departing from the spirit and scope of the invention. It is therefore the intent of the following claims to cover all such variations and modifications that fall within the spirit and scope of the invention.

What is claimed:

1. A sealed fuel level detector for detecting the level of fuel in a tank, said fuel level detector comprising a sealed housing having an outer surface and an aperture therein, a float, a pivot pin extending through said aperture, an arm connecting said float to said pivot pin wherein said pivot pin is rotated in said aperture by changes of the level of fuel in said tank, a fuel level sensor within said sealed housing and connected to said pivot pin, said pivot pin having an outer surface, a sleeve made of a flexible material and having a first open end and a second open end, said first open end sealed around said outer surface of said pivot pin and rotatable therewith, and said second open end sealed to said outer surface of said housing and stationary therewith.

2. The fuel level sensor of claim 1 wherein said second open end has a substantially larger diameter than a diameter of said first open end.

3. The fuel level detector of claim 1 wherein said first open end has a diameter substantially equal to a diameter of said second open end.

4. The fuel level detector of claim 3 wherein said sleeve has a generally fixed diameter along its length.

5. The fuel level detector of claim 3 wherein said sleeve has an enlarged diameter portion midway between said first and second open ends.

6. The fuel level detector of claim 1 wherein one of said open ends is sealed against leakage using an ultrasonic weld.

7. The fuel level detector of claim 1 wherein said sleeve is made of a plastic mesh having a metal coating.

8. The fuel level detector of claim 1 wherein said first open end is bonded to said outer surface of said pivot and said second open end is bonded to said outer surface of said housing.

* * * * *